US012707044B2

(12) United States Patent
Chernyak et al.

(10) Patent No.: US 12,707,044 B2
(45) Date of Patent: Aug. 11, 2026

(54) ENHANCED INTRA PREDICTION WITH BILATERAL FILTER

(71) Applicant: Tencent America LLC, Palo Alto, CA (US)

(72) Inventors: Roman Chernyak, Santa Clara, CA (US); Biao Wang, San Jose, CA (US); Lien-Fei Chen, Palo Alto, CA (US); Xin Zhao, San Jose, CA (US); Motong Xu, Palo Alto, CA (US); Yonguk Yoon, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/912,307

(22) Filed: Oct. 10, 2024

(65) Prior Publication Data

US 2025/0126253 A1 Apr. 17, 2025

Related U.S. Application Data

(60) Provisional application No. 63/544,118, filed on Oct. 13, 2023.

(51) Int. Cl.

*H04N 19/117* (2014.01)
*H04N 19/159* (2014.01)
*H04N 19/176* (2014.01)
*H04N 19/80* (2014.01)

(52) U.S. Cl.

CPC ......... *H04N 19/117* (2014.11); *H04N 19/159* (2014.11); *H04N 19/176* (2014.11); *H04N 19/80* (2014.11)

(58) Field of Classification Search

CPC .. H04N 19/117; H04N 19/159; H04N 19/176; H04N 19/80; H04N 19/82

See application file for complete search history.

(56) References Cited

FOREIGN PATENT DOCUMENTS

WO WO-2023274370 A1 * 1/2023 ............ H04N 19/70

OTHER PUBLICATIONS

International Search Report and Written Opinion received for PCT Patent Application No. PCT/US2024/051134, mailed on Dec. 9, 2024, 11 pages.

* cited by examiner

*Primary Examiner* — Howard D Brown, Jr.
*Assistant Examiner* — Tyler B Edwards
(74) *Attorney, Agent, or Firm* — ARENTFOX SCHIFF LLP

(57) ABSTRACT

A method of video decoding includes receiving a bitstream that comprises coded information of one or more pictures. The coded information indicates an intra prediction of a current block. The method also includes: enabling a reference sample filtering with a bilateral filter when the current block satisfies one or more conditions associated with the reference sample filtering; applying the reference sample filtering with the bilateral filter on reference samples of the current block to obtain filtered reference samples when the reference sample filtering with the bilateral filter is enabled; and reconstructing one or more samples of the current block according to the intra prediction using the filtered reference samples.

20 Claims, 9 Drawing Sheets

ENHANCED INTRA PREDICTION WITH BILATERAL FILTER

INCORPORATION BY REFERENCE

The present application claims the benefit of priority to U.S. Provisional Application No. 63/544,118, "ENHANCED INTRA PREDICTION WITH BILATERAL FILTER" filed on Oct. 13, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods and apparatuses for video encoding/decoding. In some examples, an apparatus for video encoding/decoding includes processing circuitry.

Some aspects of the disclosure provide a method of video decoding. The method includes: receiving a bitstream that comprises coded information of one or more pictures. The coded information indicates an intra prediction of a current block. The method also includes: enabling a reference sample filtering with a bilateral filter when the current block satisfies one or more conditions associated with the reference sample filtering; applying the reference sample filtering with the bilateral filter on reference samples of the current block to obtain filtered reference samples when the reference sample filtering with the bilateral filter is enabled; and reconstructing one or more samples of the current block according to the intra prediction using the filtered reference samples.

Some aspects of the disclosure provide a method of video encoding. The method includes: determining to encode a current block using an intra prediction; enabling a reference sample filtering with a bilateral filter when the current block satisfies one or more conditions associated with the reference sample filtering; applying the reference sample filtering with the bilateral filter on reference samples of the current block to obtain filtered reference samples when the reference sample filtering with the bilateral filter is enabled; and encoding, using the intra prediction, the current block into coded information in a bitstream according to the filtered reference samples.

Aspects of the disclosure also provide an apparatus for video encoding/decoding.

Aspects of the disclosure also provide a method for processing visual media data. In the method, a bitstream of visual media data is processed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
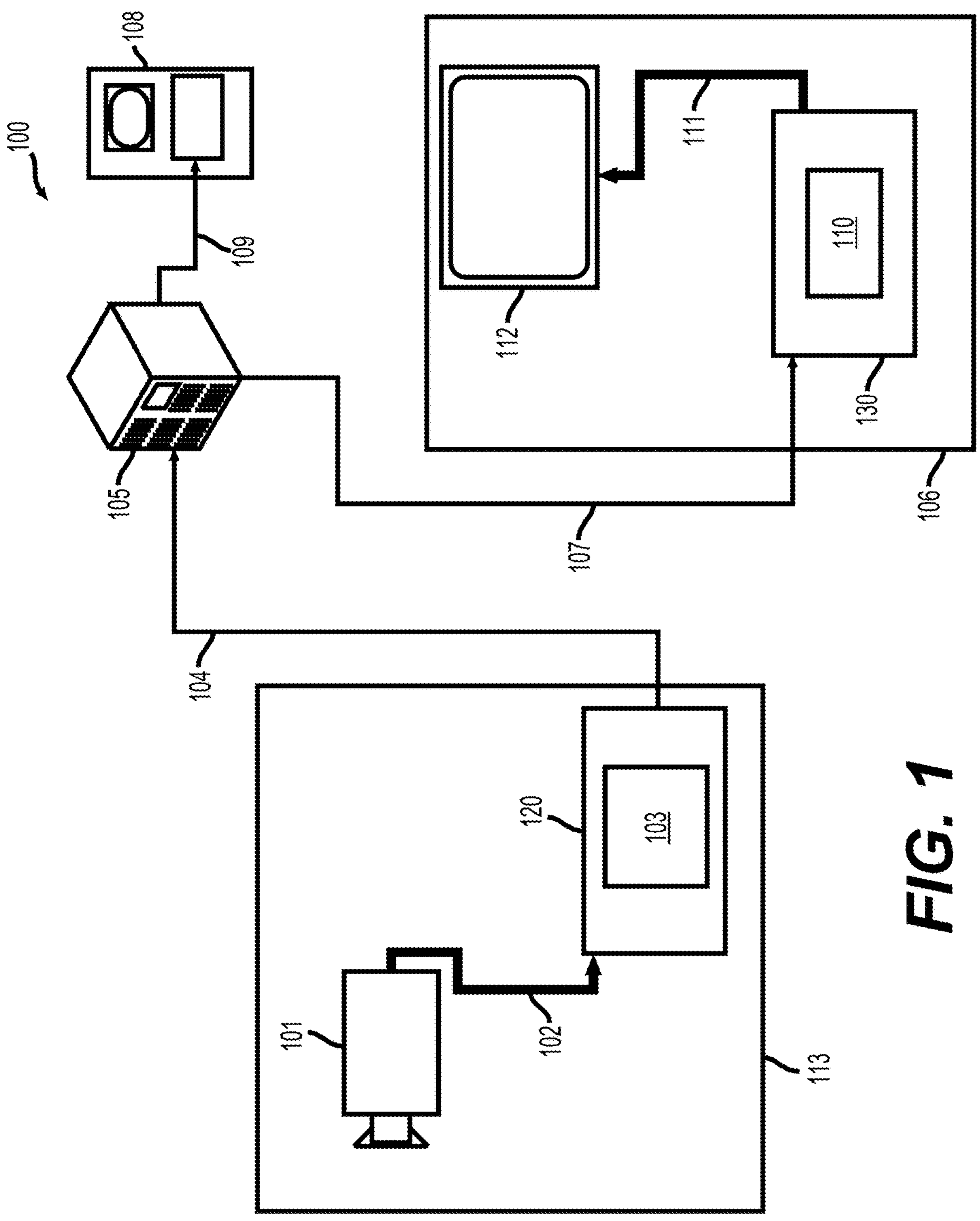
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
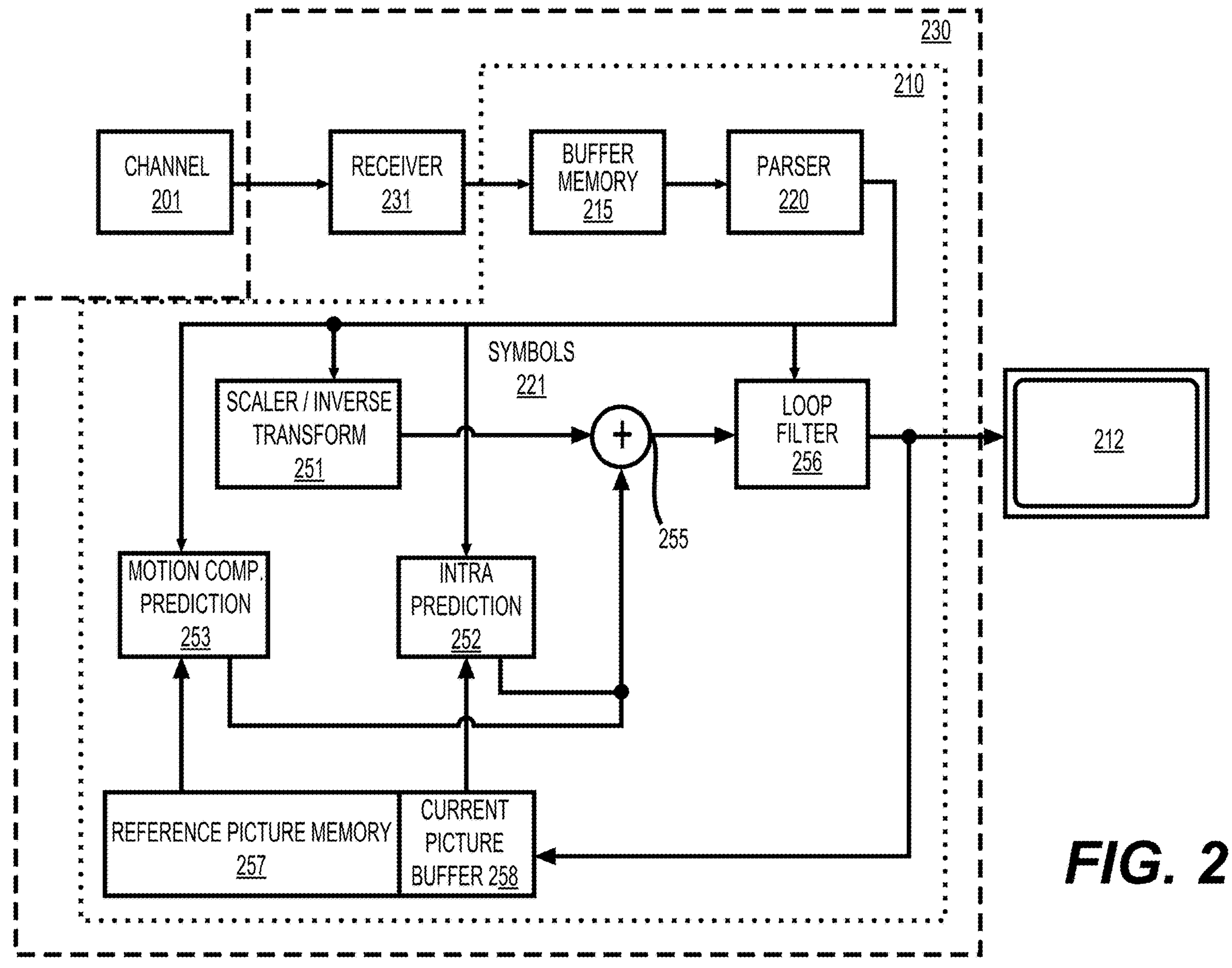
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
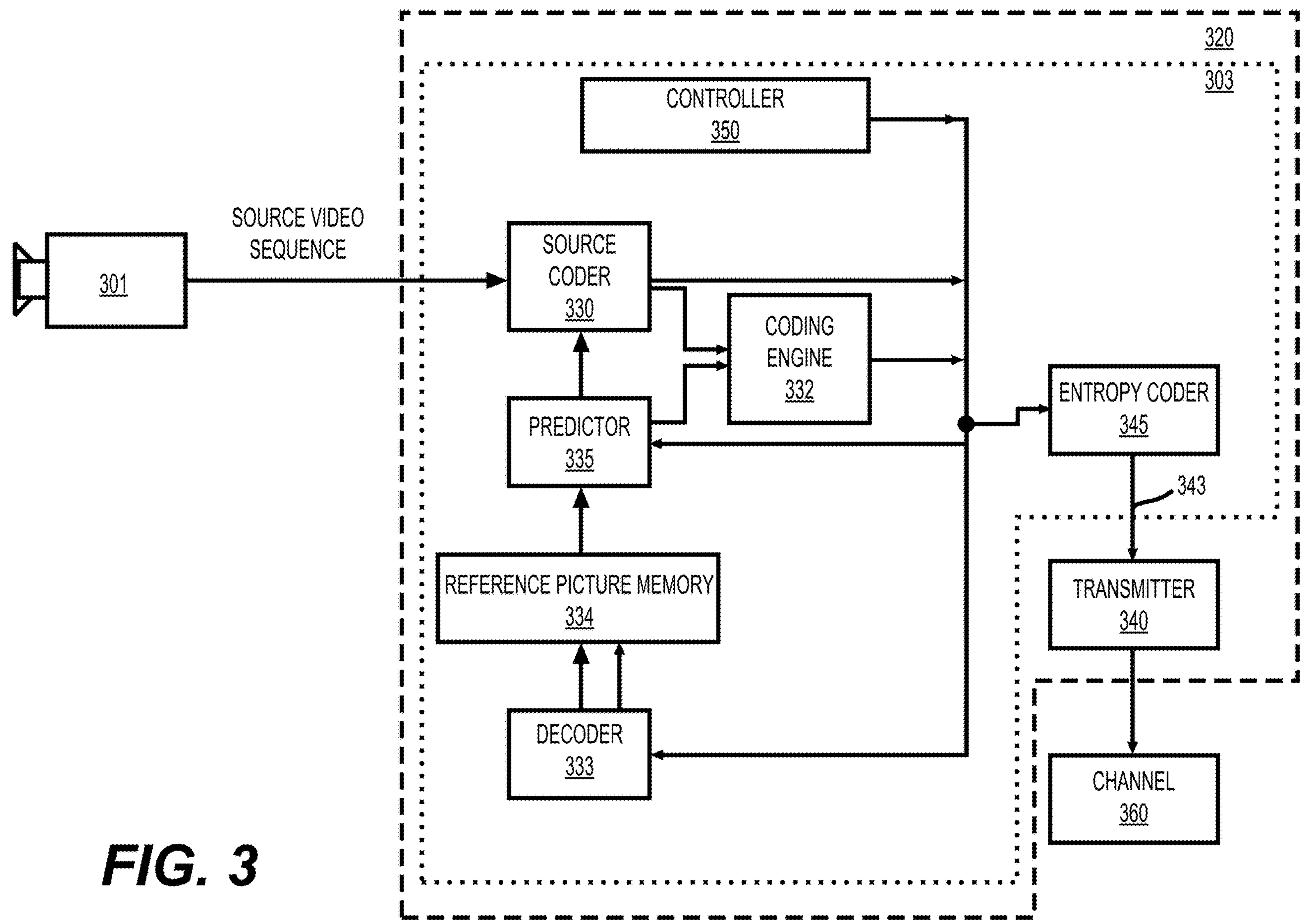
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some examples, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Some aspects of the disclosure provide techniques to enhance intra prediction with bilateral filter.

Figure 4:
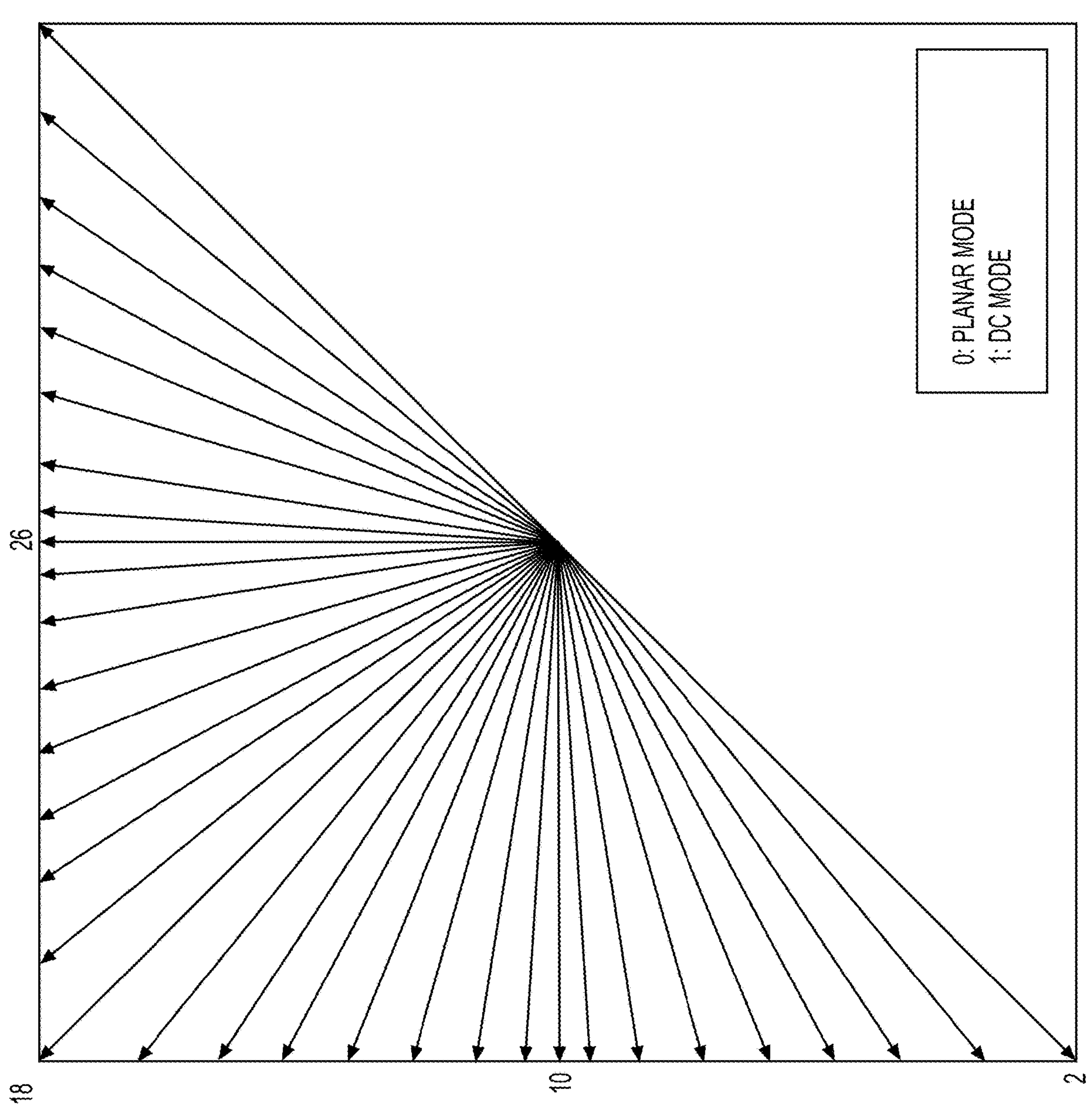
FIG. 4 shows a diagram of intra prediction modes in some examples.

FIG. 4 shows a diagram of intra prediction modes in some examples, such as HEVC. For example, HEVC uses a total of 35 intra prediction modes (e.g., mode 0 to mode 34). Among the 35 intra prediction modes, some modes are directional modes and some modes are non directional modes. In some examples, mode 0 and mode 1 are non directional modes, for example, mode 0 is a planar mode, and mode 1 is DC mode. Further, mode 2 to mode 34 can be directional modes, for example, mode 10 is horizontal mode, mode 26 is vertical mode, and mode 2, mode 18 and mode 34 are diagonal modes, and the like. Values of samples in a coding block are determined according to the neighboring references samples in the same picture and the intra prediction mode of the coding block. In an example, in the DC mode, a mean value is calculated by averaging reference samples in the same picture and can be used for flat surfaces. In another example, in the planar mode, the value of each sample in the coding block is calculated assuming an amplitude surface with a horizontal and vertical smooth gradient derived from the boundaries samples of the neighboring blocks. In some examples, the reference samples include neighboring samples in a row immediately above the coding block and/or include neighboring samples in a column immediately left of the coding block.

In some examples, the intra prediction modes are signaled based on a list of most probable modes (MPMs), and remaining modes. For example, for a coding block, an MPM list is determined. In an example, the MPM list includes 3 modes from the 35 intra prediction modes. Then, when the specific intra prediction mode of the coding block is one of the 3 modes in the MPM list, an index indicative of the one of the 3 modes is used for signaling. When the specific intra prediction mode of the coding block is not one of the 3 modes in the MPM list, an index indicative of one from the remaining modes (32 modes) is used for signaling. In some examples, the MPM list can include other suitable number of modes, such as 6, 10, and the like.

It is noted other suitable number of intra prediction modes can be used.

Figure 5:
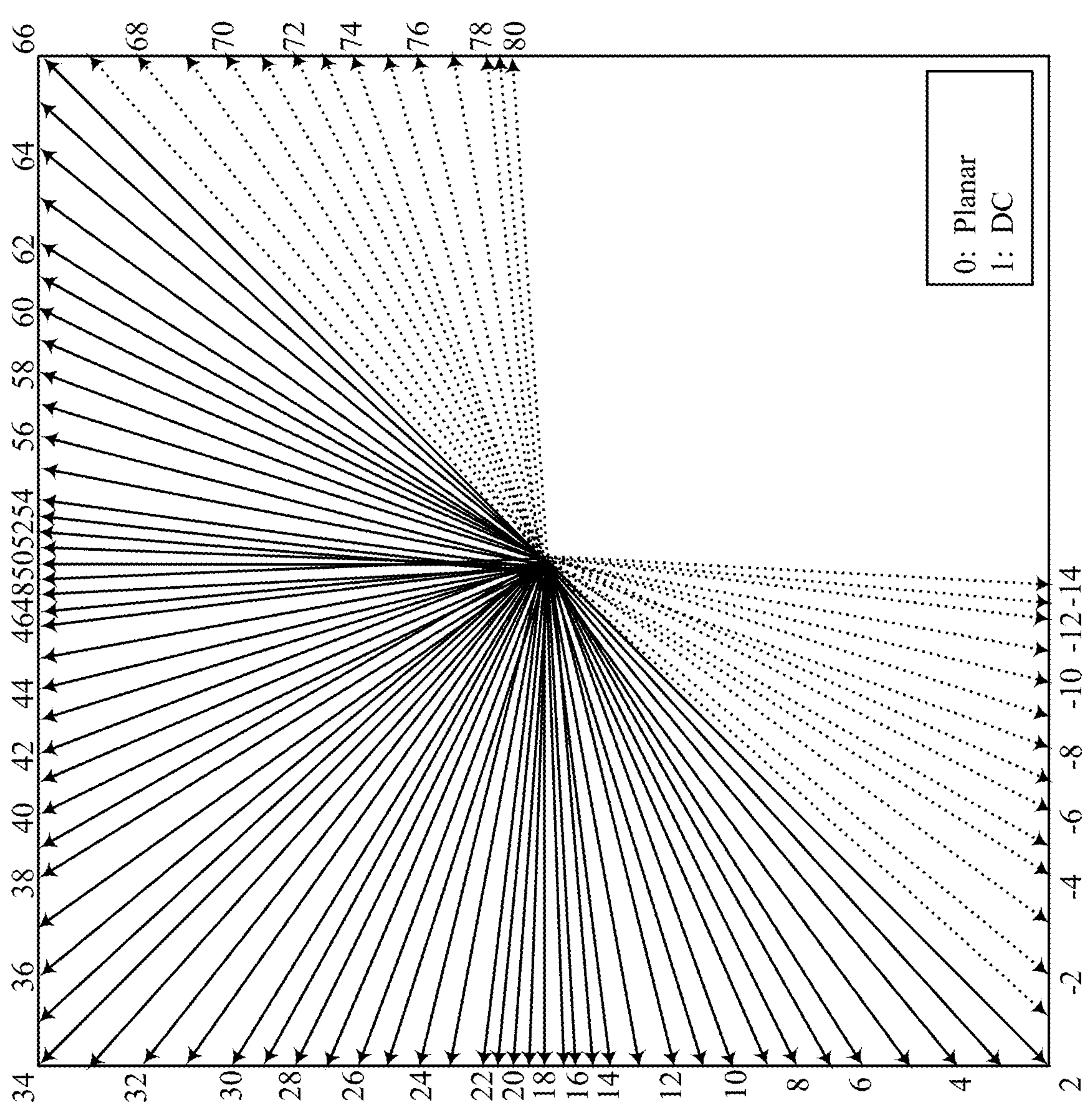
FIG. 5 shows a diagram of intra prediction modes in some examples.

FIG. 5 shows a diagram of intra prediction modes in some examples, such as VVC. In some examples, VVC can use a total of 95 intra prediction modes, such as mode −14 to mode 80. Among the 95 intra prediction modes, mode 0 is a planar mode, mode 1 is DC mode, mode 18 is horizontal mode, mode 50 is vertical mode, and mode 2, mode 34 and mode 66 are diagonal modes. Modes −1 to −14 and modes 67 to 80 are referred to wide-angle intra prediction (WAIP) modes in some examples.

In some examples, to code an intra mode (also referred to as intra prediction mode) of a coding block (e.g., a luma block, chroma blocks of a coding unit), a most probable mode (MPM) list of size 3 is built based on the intra modes of the neighboring blocks of the coding block. The MPM list can be referred to as the MPM list or primary MPM list. If the intra mode of the coding block is not from the MPM list, a flag is signaled to indicate whether intra mode belongs to the selected modes in the MPM list.

In some related examples, the reference samples for intra prediction of a coding block are located in immediately next to the coding block. The neighboring portion to the coding block that is formed by the reference samples can be referred to as a reference line.

According to an aspect of the disclosure, techniques that are referred to as multi-line intra prediction can use more reference lines for intra prediction. In some examples, the encoder decides and signals which reference line is used to generate the intra predictor. In an example, the reference line index is signaled before intra prediction mode, and only the most probable modes are allowed in case a nonzero reference line index is signaled.

Figure 6:
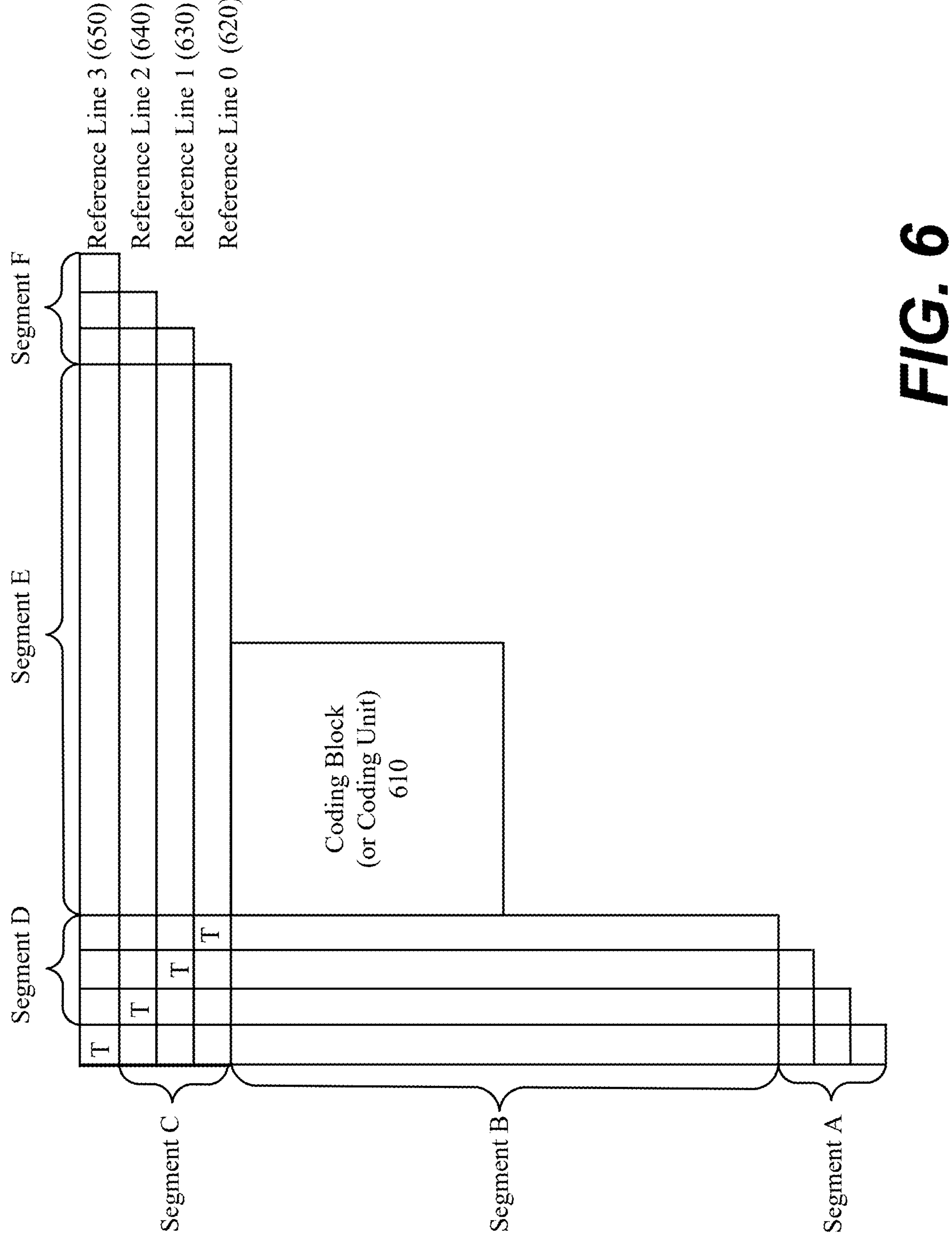
FIG. 6 shows a diagram of multiple reference lines in some examples.

FIG. 6 shows a diagram of multiple reference lines in some examples. In FIG. 6, 4 reference lines of a coding block (610) are shown. The first reference line (620) which is also referred to as reference line 0 includes a row of reference samples immediately above the coding block (610) and a column of reference samples immediately left of the coding block (610). The second reference line (630) which is also referred to as reference line 1 includes a row of reference samples immediately above the first reference line (620) and a column of reference samples immediately left of the first reference line (620). The third reference line (640) which is also referred to as reference line 2 includes a row of reference samples immediately above the second reference line (630) and a column of reference samples immediately left of the second reference line (630). The fourth reference line (650) which is also referred to as reference line 3 includes a row of reference samples immediately above the third reference line (640) and a column of reference samples immediately left of the third reference line (640). Further, each reference line is composed of six segments, such as shown by Segment A to F, together with the top-left reference samples shown by T. In some examples, Segment A and Segment F are padded with the closest samples from Segment B and E, respectively.

In the intra prediction of video codecs (e.g., VVC and ECM), the reference samples from the neighboring reconstruction areas can be filtered by some predefined filter (e.g. [1, 2, 1]/4) to generate the final predictor or unfiltered and directly copied as the predictor based on the intra prediction mode, block size, etc. The predefined filter has fixed filter coefficients that are predefined.

In some examples, reference sample filtering is applicable to the neighboring reference samples of the current block. The reference sample filtering is also referred to as pre-filtering because the reference sample filtering is applied to the neighboring reference samples before intra prediction unlike post-filtering which is filtering applied to the prediction sample after intra prediction. In a related example, a predefined filter of [1, 2, 1]/4 can be used.

For example, a filtered sample value p(x,y) is derived according to Eq. (1)-Eq. (5), where refUnfilt denotes neighboring reference samples which have not yet been filtered, and (x, y) denotes x and y coordinates of the corresponding sample. For example, the top-left sample position coordinates of the current block are (0, 0). In the example, the reference area includes a reference line of x=−1, y=−1 to refH−1 and a reference column of x=0 to refW−1, y=−1. In the example, refH may be determined as twice the height of the transform block or the coding block, and refW may be determined as twice the width of the transform block or the coding block.

$$p(-1,-1) = (refUnfilt(-1,0) + 2 \times refUnfilt(-1,-1) + refUnfilt(0,-1) + 2) >> 2 \quad \text{Eq. (1)}$$

$$p(-1,y) = (refUnfilt(-1,y+1) + 2 \times refUnfilt(-1,y) + refUnfilt(-1,y-1) + 2) >> 2 \text{ where, } y = 0 \text{ to } refH-2 \quad \text{Eq. (2)}$$

$$p(-1, refH-1) = refUnfilt(-1, refH-1) \quad \text{Eq. (3)}$$

$$p(x,-1) = (refUnfilt(x-1,-1) + 2 \times refUnfilt(x,-1) + refUnfilt(x+1,-1) + 2) >> 2 \text{ where, } x = 0 \text{ to } refW-2 \quad \text{Eq. (4)}$$

$$p(refW-1,-1) = refUnfilt(refW-1,-1) \quad \text{Eq. (5)}$$

It is noted that when filtering is applied to the neighboring reference samples, the filtered neighboring reference samples may be used as reference samples in the prediction sample derivation step to generate the final predictor, when filtering is not applied to the neighboring reference samples, the unfiltered neighboring reference samples may be used as the reference samples in the prediction sample derivation step to generate the final predictor.

According to an aspect of the disclosure, a bilateral filter can be used in reference sample filtering. A bilateral filter is a non-linear, edge-preserving, and noise-reducing smoothing filter for images. The bilateral filter can replace the intensity of each pixel with a weighted average of intensity values from nearby pixels. The weight can be based on a Gaussian distribution. For example, the weights depend not only on Euclidean distance of pixel samples, but also on the radiometric differences (e.g., range differences, such as color intensity, depth distance, etc.). In a bilateral filter, the filter weights to taps can decrease not only with the distance between the samples, but also with increasing difference in intensity. Thus, over-smoothing of edges can be ameliorated. In an example, weight can be defined as shown by Eq. (6):

$$w(\Delta x, \Delta y, \Delta I) = e^{-\frac{\Delta x^2 + \Delta y^2}{2\sigma_d^2} - \frac{\Delta I^2}{2\sigma_r^2}} \quad \text{Eq. (6)}$$

where Δx and Δy are respectively distances in the vertical and horizontal and ΔI is the difference in intensity between the samples. In some examples, the edge-preserving denoising bilateral filter adopts a low-pass Gaussian filter for both the domain filter and the range filter. The domain low-pass Gaussian filter gives higher weight to pixels that are spatially close to the center pixel. The range low-pass Gaussian filter gives higher weight to pixels that are similar to the center pixel. Combining the range filter and the domain filter, a bilateral filter at an edge pixel becomes an elongated Gaussian filter that is oriented along the edge and is greatly reduced in gradient direction. For this reason, the bilateral filter can smooth the noise while preserving edge structures.

Some aspects of the present disclosure provide techniques to further enhance intra prediction with bilateral filter. The techniques may be used separately or combined in any order. Further, the techniques may be implemented by processing circuitry (e.g., one or more processors or one or more integrated circuits). It is noted that the techniques can be used in various video codecs including but not limited to the ones mentioned in the present disclosure.

In some related examples, for intra prediction, samples from the neighboring reconstruction areas are used as reference samples to generate the predictor of the current block. The reference samples can be directly copied without any filtering as the predictor or can be filtered by a predefined filter with fixed filter coefficients, such as a [1, 2, 1]/4 filter, and then copied as the predictor. However, the final predictor may still contain reconstruction noise or may over smooth edges.

According to an aspect of the present disclosure, a bilateral filter is used for reference sample filtering in the intra prediction. The bilateral filter can be used in the replace of other reference sample filter, such as the [1, 2, 1]/4 filter, or work in serial or in parallel with other reference sample filter(s). When saying work in serial with another reference sample filter, a bilateral filter can be introduced as an additional filtering step to generate the final predictor. When saying work in parallel with the other reference sample filter, a bilateral filter and the other reference sample filter are executed exclusively.

It is also noted that the reference sample filtering techniques in the present disclosure are applicable to each, all or any combination of the signal color components.

According to some aspects of the disclosure, a conditional bilateral filtering stage (bilateral filter) for intra prediction is used to generate the final predictor of the current block. For example, when a current block is determined for encoding/decoding by an intra prediction, encoder/decoder can enable a reference sample filtering with a bilateral filter when the current block satisfies one or more conditions associated with the reference sample filtering. Then, the reference sample filtering with the bilateral filter can be applied on reference samples of the current block to obtain filtered reference samples when the reference sample filtering with the bilateral filter is enabled. Then, the filtered reference samples are used for the encoding/decoding of the current block by the intra prediction.

Various conditions can be used to determine the reference sample filtering configuration for processing reference samples for intra prediction.

In a first condition example, for the pure vertical and/or horizontal mode, references samples can be copied without any filtering and all other modes are filtered by a reference sample filtering with the bilateral filter directly or based on some additional conditions.

In a second condition example, a condition to enable the reference sample filtering with the bilateral filter for reference samples is when the intra mode directly use the reference samples that fall into the integer position, e.g. intra mode 0 (PLANAR_IDX), intra mode −14, intra mode −12, intra mode −10, intra mode −6, intra mode 2, intra mode 34, intra mode 66, intra mode 72, intra mode 76, intra mode 78, or intra mode 80 in VVC.

In a third condition example, a condition to enable the filtering (e.g. reference sample filtering with the bilateral filter) for reference samples is that no multiple reference line intra prediction is applied. For example, the reference samples are in the above line of the current block or in the left column to the current block.

In a fourth condition example, a condition to enable the filtering (e.g. reference sample filtering with the bilateral filter) for reference samples is that no intra sub-partition prediction is applied. For example, the current block does not have further partitions.

In a fifth condition example, one condition to enable the filtering (e.g. reference sample filtering with the bilateral filter) for reference samples is that the block size is larger than some specific number of samples.

In a sixth condition example, one condition to enable the filtering (e.g. reference sample filtering with the bilateral filter) for reference samples is that the prediction block is within luma component. For example, there is no chroma component associated with the prediction block, or separate trees are used for luma component and chroma component, the prediction block is associated with the luma tree.

In a seventh condition example, one condition to enable the filtering (e.g. reference sample filtering with the bilateral filter) for reference samples is the combination of conditions from the first example to the sixth examples.

In an eighth condition example, one condition to enable the filtering (e.g. reference sample filtering with the bilateral filter) for reference samples is to use explicitly signalled flag determining the bilateral filter use.

According to a first aspect of the disclosure, only the bilateral filtering is used in the reference sample filtering with the bilateral filter to generate the predictor of intra prediction. Whether to use the bilateral filter depends on some internal information of encoder or decoder, such as one or more conditions or any combination of conditions in the first condition example to the eighth condition example.

According to a second aspect of the disclosure, two filters including the bilateral filter and a predefined filter are used in the reference sample filtering with the bilateral filter to generate the predictor. The bilateral filter can be applied before or after the predefined filter. In an example, the reference sample filtering includes a first stage of a bilateral filter and a second stage of a predefined filter that are connected in series. The bilateral filter can be placed before the predefined filter or the bilateral filter can be placed after the predefined filter. Whether to use the reference sample filtering with the bilateral filter depends on some internal information of encoder or decoder, such as one or more conditions or any combination of conditions in the first condition example to the eighth condition example. In some examples, the predefined filter is [1, 2, 1]/4 filter.

According to a third aspect of the disclosure, two filters including the bilateral filter and a predefined filter are used in a reference sample filtering to generate the predictor, and the bilateral filter and the predefined filter are executed exclusively. In an example, the reference sample filtering includes the bilateral filter and the predefined filter connected in parallel. In an example, one or more conditions or any combination of conditions in the first condition example to the eighth condition example can be used to determine whether to use a reference sample filtering or a bypass path (no use of any filtering). When the reference sample filtering is determined to be enabled, which filter (e.g., the bilateral filter or the predefined filter) to use depends on some internal or signalled information. In an example, when the current block size is less than a threshold (e.g., 64), the predefined filter (e.g., [1, 2, 1]/4) is used to generate the predictor. Otherwise, the bilateral filter is applied. In another example, when the block content variance (e.g., luma variance, chroma variance and the like) is less than a threshold, the predefined filter (e.g., [1, 2, 1]/4) is used to generate the predictor. Otherwise, the bilateral filter is applied.

According to a fourth aspect of the disclosure, two filters including a bilateral filter and a predefined filter are used to generate the predictor. The conditions, such as one or more conditions or any combination of conditions from the first condition example to the eighth condition example, can be used to determine whether to use the two filters. When the decision is not to filter the reference sample, the bilateral filter is used to filter the reference sample. Otherwise, the predefined filter is used.

According to a fifth aspect of the disclosure, two filters including the bilateral filter and a predefined filter are used to generate the predictor. A bilateral filter is applied before all succeeding processes. The output of the bilateral filter could be either filtered by a predefined filter or directly copied as predictor based on conditions, such as one or more conditions or any combination of conditions in the first condition example to the eighth condition example.

According to a sixth aspect of the disclosure, two filters including the bilateral filter and a predefined filter are used to generate the predictor. A bilateral filter is applied right before generating the final predictor. Thus, the reference samples are filtered by the predefined filter first or directly used based on one or more conditions, such as one or more conditions or any combination of conditions in the first condition example to the eighth condition example. The output of the predefined filter or the unfiltered reference sample is filtered by a bilateral filter.

According to a seventh aspect of the disclosure, the techniques in the first aspect to the sixth aspect can be used when one of the non-conventional intra prediction modes (including but not limited to decoder side intra mode derivation, template-based intra mode derivation, gradient position dependent intra prediction) is enabled.

According to an eighth aspect of the disclosure, a syntax element indicative of whether to use the bilateral filter can be signaled, the syntax element can be in high level syntax (HLS) (e.g., sequence parameter set (SPS), video parameter set (VPS), picture parameter set (PPS), adaptation parameter set (APS), picture header, slice header) and/or can be a block level (e.g., CTU, CU, PU, TU) syntax element.

Figure 7:
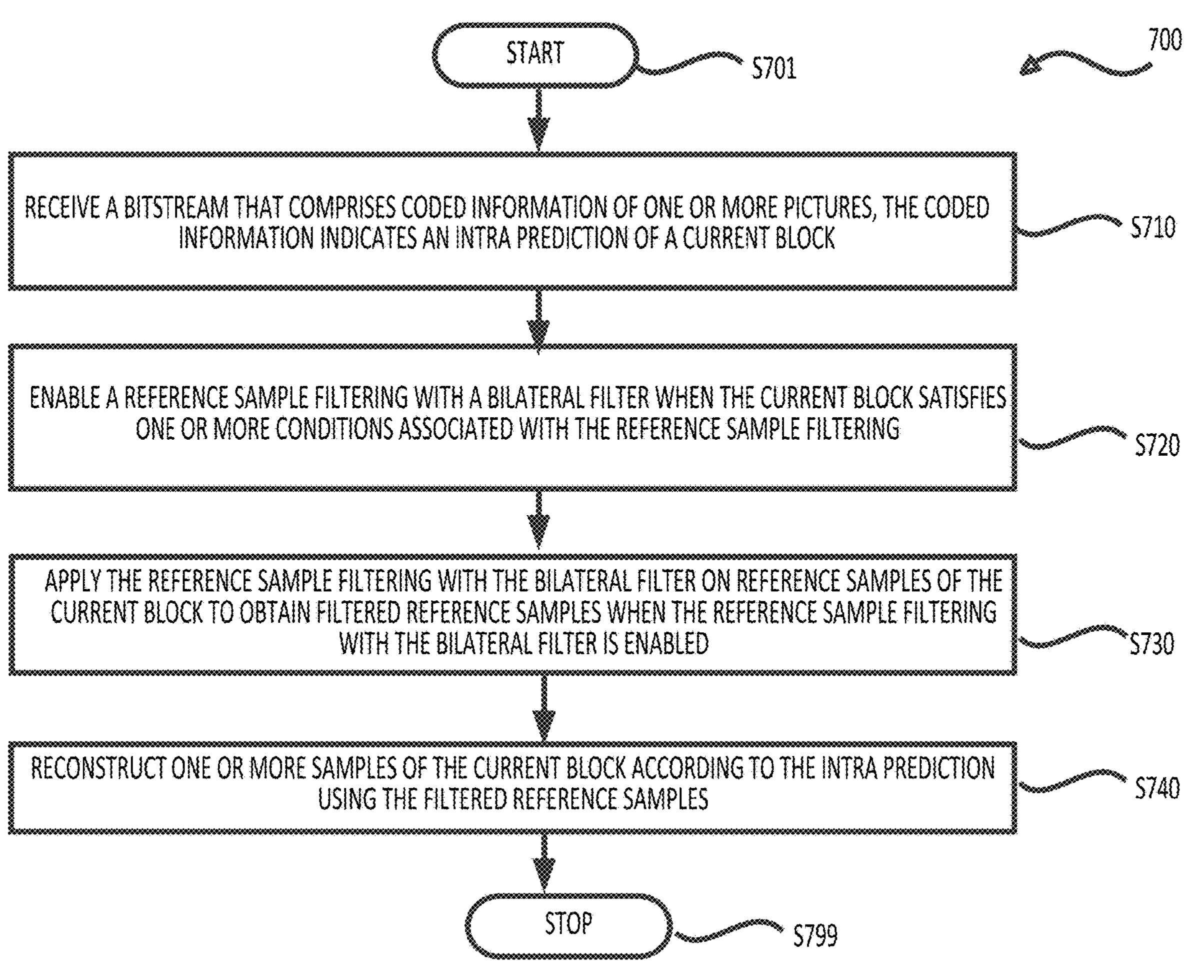
FIG. 7 shows a flow chart outlining a decoding process according to some aspects of the disclosure.

FIG. 7 shows a flow chart outlining a process (700) according to an aspect of the disclosure. The process (700) can be used in a video decoder. In various aspects, the process (700) is executed by processing circuitry, such as the processing circuitry that performs functions of the video decoder (110), the processing circuitry that performs functions of the video decoder (210), and the like. In some aspects, the process (700) is implemented in software instructions, thus when the processing circuitry executes the software instructions, the processing circuitry performs the process (700). The process starts at (S701) and proceeds to (S710).

At (S710), a bitstream that includes coded information of one or more pictures is received, the coded information indicates an intra prediction of a current block in a current picture.

At (S720), a reference sample filtering with a bilateral filter is enabled when the current block satisfies one or more conditions associated with the reference sample filtering.

At (S730), the reference sample filtering with the bilateral filter is applied on reference samples of the current block to obtain filtered reference samples when the reference sample filtering with the bilateral filter is enabled.

At (S740), one or more samples of the current block are reconstructed by the intra prediction according to the filtered reference samples.

In some examples, when the current block fails to satisfy the one or more conditions, one or more samples of the current block are reconstructed by the intra prediction according to the reference samples without filtering.

According to some aspects of the disclosure, the one or more conditions comprise at least one of: a prediction mode of the intra prediction is not a vertical mode; the prediction mode of the intra prediction is not a horizontal mode; the prediction mode uses integer position reference samples; no multiple reference line intra prediction is applied; no sub-partition prediction is applied; a block size of the current block is larger than a threshold; the current block is a prediction block within luma component; and/or a flag associated with the current block is decoded from the bitstream and indicates a use of the bilateral filter.

In some examples, the reference sample filtering includes a single filtering stage of the bilateral filter.

In some examples, the reference sample filtering uses the bilateral filter and a predefined filter with fixed filter coefficients that are connected in series.

In some examples, the reference sample filtering uses the bilateral filter and a predefined filter with fixed filter coefficients that are connected in parallel. In an example, the predefined filter is applied in the reference sample filtering when a block size of the current block is less than a threshold; and the bilateral filter is applied in the reference sample filtering when the block size of the current block is equal to or greater than the threshold. In another example, the predefined filter is applied in the reference sample filtering when a block content variance of the current block is less than a threshold; and the bilateral filter is applied in the reference sample filtering when the block content variance of the current block is equal to or greater than the threshold.

In some examples, the reference sample filtering includes the bilateral filter and/or a predefined filter with fixed filter coefficients. The bilateral filter is applied on the reference samples to obtain the filtered reference samples when the current block fails to satisfy the one or more conditions; and the predefined filter is applied on the reference samples to obtain the filtered reference samples when the current block satisfies the one or more conditions.

In some examples, the reference sample filtering includes the bilateral filter and/or a predefined filter with fixed filter coefficients. The bilateral filter is applied on the reference samples to obtain first filtered reference samples. One or more samples of the current block are reconstructed according to the intra prediction using the first filtered reference samples when the current block fails to satisfy the one or more conditions; and the one or more samples of the current block are reconstructed according to the intra prediction using second filtered reference samples when the current block satisfies the one or more conditions, the second filtered reference samples are obtained by applying the predefined filter on the first filtered reference samples.

In some examples, the reference sample filtering includes the bilateral filter and/or a predefined filter with fixed filter coefficients. The predefined filter is applied on the reference samples to obtain intermediate filtered reference samples when the current block satisfies the one or more conditions. The reference samples are copied to be the intermediate filtered reference samples when the current block fails to satisfy the one or more conditions. The bilateral filter is applied on the intermediate filtered reference samples to obtain the filtered reference samples, and the current block is reconstructed according to the intra prediction using the filtered reference samples.

In some examples, whether at least one of a decoder side intra mode derivation, a template-based intra mode derivation, and a gradient position dependent intra prediction is enabled are checked. When at least one of the decoder side intra mode derivation, the template-based intra mode derivation, and the gradient position dependent intra prediction is enabled, then whether the current block satisfies the one or more conditions associated with the reference sample filtering including the bilateral filter is determined.

In some examples, a flag is decoded from the bitstream, the flag is of a sequence parameter set (SPS) level, a video parameter set (VPS) level, a picture parameter set (PPS) level, an adaptation parameter set (APS) level, a picture header level, a slice header level and/or a block level. The reference sample filtering with the bilateral filter is applied on reference samples to obtain filtered reference samples when the flag indicates a usage of the reference sample filtering with the bilateral filter.

Then, the process proceeds to (S799) and terminates.

The process (700) can be suitably adapted. Step(s) in the process (700) can be modified and/or omitted. Additional step(s) can be added. Any suitable order of implementation can be used.

Figure 8:
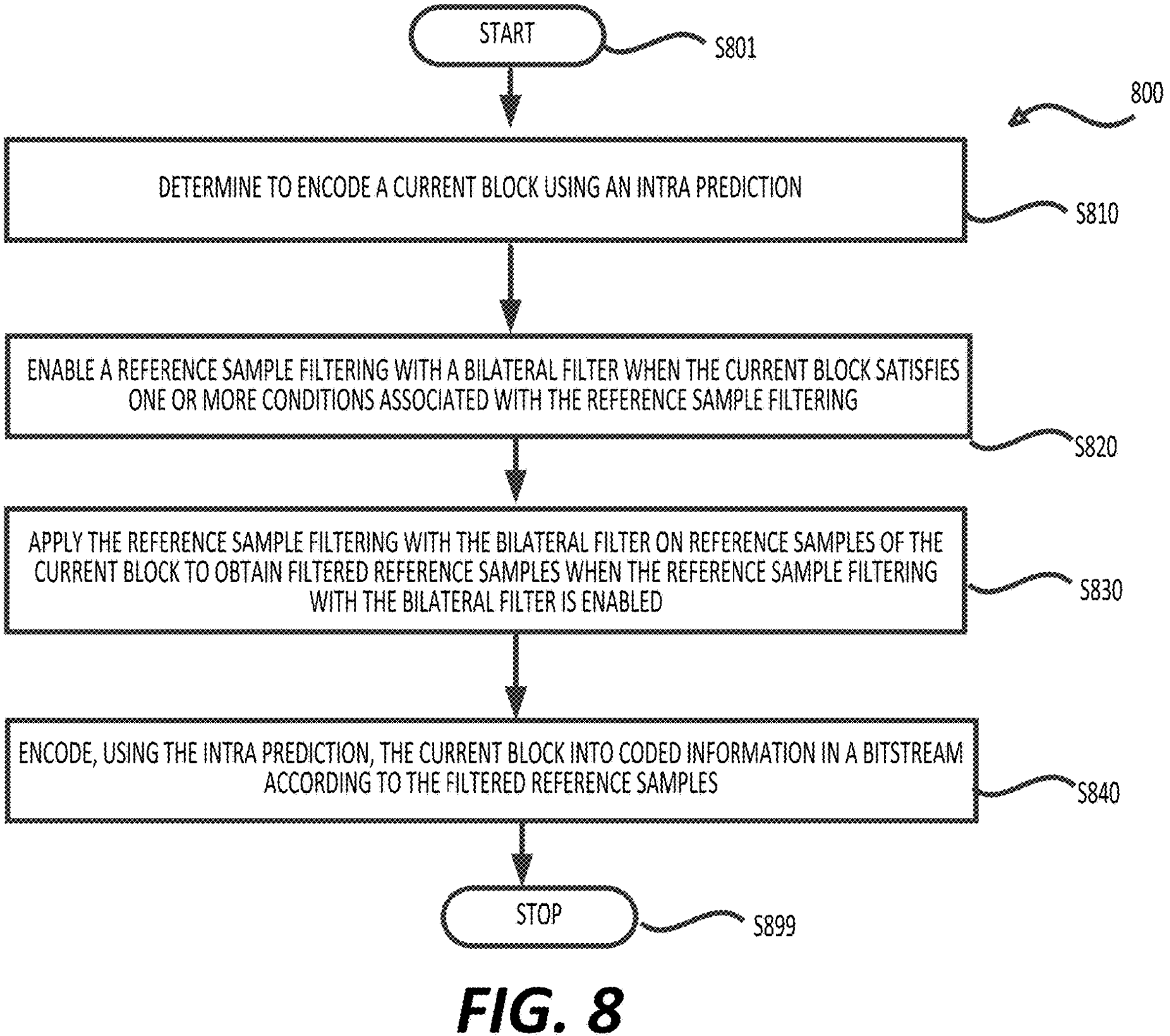
FIG. 8 shows a flow chart outlining an encoding process according to some aspects of the disclosure.

FIG. 8 shows a flow chart outlining a process (800) according to an aspect of the disclosure. The process (800) can be used in a video decoder. In various aspects, the process (800) is executed by processing circuitry, such as the processing circuitry that performs functions of the video decoder (110), the processing circuitry that performs functions of the video decoder (210), and the like. In some aspects, the process (800) is implemented in software instructions, thus when the processing circuitry executes the software instructions, the processing circuitry performs the process (800). The process starts at (S801) and proceeds to (S810).

At (S810), to encode a current block using an intra prediction is determined.

At (S820), a reference sample filtering with a bilateral filter is enabled when the current block satisfies one or more conditions associated with the reference sample filtering.

At (S830), the reference sample filtering with the bilateral filter is applied on reference samples of the current block to obtain filtered reference samples when the reference sample filtering with the bilateral filter is enabled.

At (S840), the current block is encoded by intra prediction into coded information in a bitstream according to the filtered reference samples.

In some examples, when the current block fails to satisfy the one or more conditions, the current block is encoded by the intra prediction according to the reference samples without filtering.

According to some aspects of the disclosure, the one or more conditions comprise at least one of: a prediction mode of the intra prediction is not a vertical mode; the prediction mode of the intra prediction is not a horizontal mode; the prediction mode uses integer position reference samples; no multiple reference line intra prediction is applied; no sub-partition prediction is applied; a block size of the current block is larger than a threshold; and/or the current block is a prediction block within luma component.

In some examples, the reference sample filtering includes a single filtering stage of the bilateral filter.

In some examples, the reference sample filtering uses the bilateral filter and a predefined filter that are connected in series.

In some examples, the reference sample filtering uses the bilateral filter and a predefined filter that are connected in parallel. In an example, the predefined filter in the reference sample filtering is applied when a block size of the current block is less than a threshold; and the bilateral filter in the reference sample filtering is applied when the block size of the current block is equal to or greater than the threshold. In another example, the predefined filter in the reference sample filtering is applied when a block content variance of the current block is less than a threshold; and the bilateral filter in the reference sample filtering is applied when the block content variance of the current block is equal to or greater than the threshold.

In some examples, the reference sample filtering includes the bilateral filter and/or a predefined filter, the bilateral filter in the reference sample filtering is applied on the reference samples to obtain the filtered reference samples when the current block fails to satisfy the one or more conditions; and the predefined filter in the reference sample filtering on the reference samples is applied to obtain the filtered reference samples when the current block satisfies the one or more conditions.

In some examples, the reference sample filtering includes the bilateral filter and/or a predefined filter, the bilateral filter is applied on reference samples to obtain first filtered reference samples; the current block is encoded by the intra prediction according the first filtered reference samples when the current block fails to satisfy the one or more conditions; and the current block is encoded by the intra prediction according to second filtered reference samples when the current block satisfy the one or more conditions, the second filtered reference samples are obtained by applying the predefined filter on the first filtered reference samples.

In some examples, the reference sample filtering includes the bilateral filter and/or a predefined filter, the predefined filter is applied on reference samples to obtain intermediate filtered reference samples when the current block satisfies the one or more conditions; the reference samples are copied to be the intermediate filtered reference samples when the current block fails to satisfy the one or more conditions; and the bilateral filter is applied on the intermediate filtered reference samples to obtain the filtered reference samples.

In some examples, whether at least one of a decoder side intra mode derivation, a template-based intra mode derivation, and a gradient position dependent intra prediction is enabled is checked. When at least one of the decoder side intra mode derivation, the template-based intra mode derivation, and the gradient position dependent intra prediction is enabled, whether the current block satisfies the one or more conditions associated with the reference sample filtering including the bilateral filter is determined.

In some examples, when the reference sample filtering with the bilateral filter is applied, a flag is encoded into the bitstream, the flag indicates a usage of the reference sample filtering with the bilateral filter, the flag is of a sequence parameter set (SPS) level, a video parameter set (VPS) level, a picture parameter set (PPS) level, an adaptation parameter set (APS) level, a picture header level, a slice header level and/or a block level.

Then, the process proceeds to (S899) and terminates.

The process (800) can be suitably adapted. Step(s) in the process (800) can be modified and/or omitted. Additional step(s) can be added. Any suitable order of implementation can be used.

According to an aspect of the disclosure, a method of processing visual media data is provided. In the method, a bitstream of visual media data is processed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

For example, the bitstream includes coded information of one or more pictures, the coded information indicating an intra prediction of a current block in a current picture. The format rule specifies that a reference sample filtering with a bilateral filter is enabled when the current block satisfies one or more conditions associated with the reference sample filtering, the reference sample filtering with the bilateral filter is applied on reference samples of the current block to obtain filtered reference samples when the reference sample filtering with the bilateral filter is enabled; and one or more samples of the current block are reconstructed according to the intra prediction using the filtered reference samples.

The techniques described above, can be implemented as computer software using computer-readable instructions and physically stored in one or more computer-readable media. For example, FIG. 9 shows a computer system (900) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
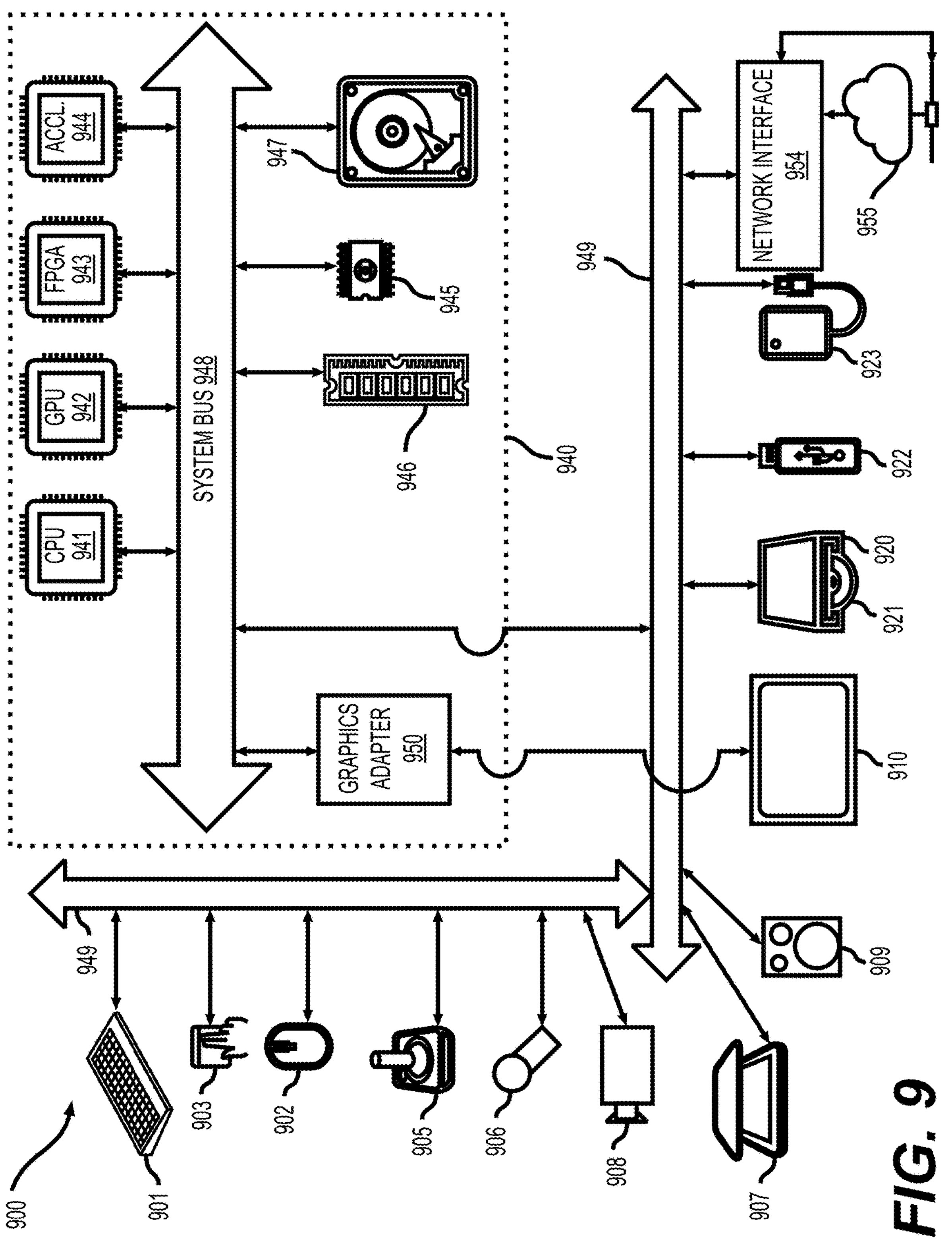
FIG. 9 is a schematic illustration of a computer system in accordance with an aspect.

The components shown in FIG. 9 for computer system (900) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various aspects of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of video decoding, the method including: receiving a bitstream that comprises coded information of one or more pictures, the coded information indicating an intra prediction of a current block; enabling a reference sample filtering with a bilateral filter when the current block satisfies one or more conditions associated with the reference sample filtering; applying the reference sample filtering with the bilateral filter on reference samples of the current block to obtain filtered reference samples when the reference sample filtering with the bilateral filter is enabled; and reconstructing one or more samples of the current block according to the intra prediction using the filtered reference samples.

(2) The method of feature (1), in which when the current block fails to satisfy the one or more conditions, the method including reconstructing one or more samples of the current block according to the intra prediction using the reference samples without filtering.

(3) The method of any of features (1) to (2), in which the one or more conditions comprise at least one of: a prediction mode of the intra prediction is not a vertical mode; the prediction mode of the intra prediction is not a horizontal mode; the prediction mode uses integer position reference samples; no multiple reference line intra prediction is applied; no sub-partition prediction is applied; a block size of the current block is larger than a threshold; the current block is a prediction block within luma component; and/or a flag associated with the current block is decoded from the bitstream and indicates a use of the bilateral filter.

(4) The method of any of features (1) to (3), in which the reference sample filtering includes a single filtering stage of the bilateral filter.

(5) The method of any of features (1) to (4), in which the reference sample filtering uses the bilateral filter and a predefined filter that are connected in series.

(6) The method of any of features (1) to (5), in which wherein the reference sample filtering uses the bilateral filter and a predefined filter that are connected in parallel.

(7) The method of any of features (1) to (6), the method also including: applying the predefined filter when a block size of the current block is less than a threshold; and applying the bilateral filter in the reference sample filtering when the block size of the current block is equal to or greater than the threshold.

(8) The method of any of features (1) to (7), the method including: applying the predefined filter when a block content variance of the current block is less than a threshold; and applying the bilateral filter when the block content variance of the current block is equal to or greater than the threshold.

(9) The method of any of features (1) to (8), in which the reference sample filtering includes the bilateral filter and/or a predefined filter, and the method including: applying the bilateral filter on the reference samples to obtain the filtered reference samples when the current block fails to satisfy the one or more conditions; and applying the predefined filter on the reference samples to obtain the filtered reference samples when the current block satisfies the one or more conditions.

(10) The method of any of features (1) to (9), in which the reference sample filtering includes the bilateral filter and/or a predefined filter, and the method including: applying the bilateral filter on the reference samples to obtain first filtered reference samples; reconstructing one or more samples of the current block according to the intra prediction using the first filtered reference samples when the current block fails to satisfy the one or more conditions; and reconstructing the one or more samples of the current block according to the intra prediction using second filtered reference samples when the current block satisfies the one or more conditions, the second filtered reference samples being obtained by applying the predefined filter on the first filtered reference samples.

(11) The method of any of features (1) to (10), in which the reference sample filtering includes the bilateral filter and/or a predefined filter, and the method including: applying the predefined filter on the reference samples to obtain intermediate filtered reference samples when the current block satisfies the one or more conditions; copying the reference samples to be the intermediate filtered reference samples when the current block fails to satisfy the one or more conditions; applying the bilateral filter on the intermediate filtered reference samples to obtain the filtered reference samples; and reconstructing the current block according to the intra prediction using the filtered reference samples

(12) The method of any of features (1) to (11), the method including checking whether at least one of a decoder side intra mode derivation, a template-based intra mode derivation, and a gradient position dependent intra prediction is enabled; and when at least one of the decoder side intra mode derivation, the template-based intra mode derivation, and the gradient position dependent intra prediction is enabled, determining whether the current block satisfies the one or more conditions associated with the reference sample filtering including the bilateral filter.

(13) The method of any of features (1) to (12), the method including: decoding a flag from the bitstream, the flag being one of a sequence parameter set (SPS) level, a video parameter set (VPS) level, a picture parameter set (PPS) level, an adaptation parameter set (APS) level, a picture header level, a slice header level and/or a block level; and applying the reference sample filtering with the bilateral filter on reference samples to obtain filtered reference samples when the flag indicates a usage of the reference sample filtering with the bilateral filter.

(14) A method of video encoding, the method including: determining to encode a current block using an intra prediction; enabling a reference sample filtering with a bilateral filter when the current block satisfies one or more conditions associated with the reference sample filtering; applying the reference sample filtering with the bilateral filter on reference samples of the current block to obtain filtered reference samples when the reference sample filtering with the bilateral filter is enabled; and encoding, using the intra prediction, the current block into coded information in a bitstream according to the filtered reference samples.

(15) The method of feature (14), in which when the current block fails to satisfy the one or more conditions, the method including: encoding, using the intra prediction, the current block according to the reference samples without filtering.

(16) The method of any of features (14) to (15), in which the one or more conditions includes at least one of: a prediction mode of the intra prediction is not a vertical mode; the prediction mode of the intra prediction is not a horizontal mode; the prediction mode uses integer position reference samples; no multiple reference line intra prediction is applied; no sub-partition prediction is applied; a block size of the current block is larger than a threshold; and/or the current block is a prediction block within luma component.

(17) The method of any of features (14) to (16), in which the reference sample filtering includes a single filtering stage of the bilateral filter.

(18) The method of any of features (14) to (17), in which the reference sample filtering uses the bilateral filter and a predefined filter that are connected in series.

(19) The method of any of features (14) to (18), in which the reference sample filtering uses the bilateral filter and a predefined filter that are connected in parallel.

(20) The method of any of features (14) to (19), the method including: applying the predefined filter in the reference sample filtering when a block size of the current block is less than a threshold; and applying the bilateral filter in the reference sample filtering when the block size of the current block is equal to or greater than the threshold

(21) The method of any of features (14) to (20), the method including: applying the predefined filter in the reference sample filtering when a block content variance of the current block is less than a threshold; and applying the bilateral filter in the reference sample filtering when the block content variance of the current block is equal to or greater than the threshold.

(22) The method of any of features (14) to (21), in which the reference sample filtering includes the bilateral filter and/or a predefined filter, and the method includes applying the bilateral filter in the reference sample filtering on the reference samples to obtain the filtered reference samples when the current block fails to satisfy the one or more conditions; and applying the predefined filter in the reference sample filtering on the reference samples to obtain the filtered reference samples when the current block satisfies the one or more conditions.

(23) The method of any of features (14) to (22), in which the reference sample filtering includes the bilateral filter and/or a predefined filter, and the method includes applying the bilateral filter on reference samples to obtain first filtered reference samples; encoding, using the intra prediction, the current block according the first filtered reference samples when the current block fails to satisfy the one or more conditions; and encoding, using the intra prediction, the current block according to second filtered reference samples when the current block satisfy the one or more conditions, the second filtered reference samples being obtained by applying the predefined filter on the first filtered reference samples.

(24) The method of any of features (14) to (23), in which the reference sample filtering includes the bilateral filter and/or a predefined filter, and the method includes: applying the predefined filter on reference samples to obtain intermediate filtered reference samples when the current block satisfies the one or more conditions; copying the reference samples to be the intermediate filtered reference samples when the current block fails to satisfy the one or more conditions; and applying the bilateral filter on the intermediate filtered reference samples to obtain the filtered reference samples.

(25) The method of any of features (14) to (24), the method including: checking whether at least one of a decoder side intra mode derivation, a template-based intra mode derivation, and a gradient position dependent intra prediction is enabled; and when at least one of the decoder side intra mode derivation, the template-based intra mode derivation, and the gradient position dependent intra prediction is enabled, determining whether the current block satisfies the one or more conditions associated with the reference sample filtering including the bilateral filter.

(26) The method of any of features (14) to (25), the method further including: when the reference sample filtering with the bilateral filter is applied, encoding a flag into the bitstream, the flag indicating a usage of the reference sample filtering with the bilateral filter, the flag being one of a sequence parameter set (SPS) level, a video parameter set (VPS) level, a picture parameter set (PPS) level, an adaptation parameter set (APS) level, a picture header level, a slice header level and/or a block level.

(27) A method of processing visual media data, the method including processing a bitstream of visual media data according to a format rule. The bitstream includes coded information of one or more pictures. The coded information indicating an intra prediction of a current block in a current picture. The format rule specifies that: a reference sample filtering with a bilateral filter is enabled when the current block satisfies one or more conditions associated with the reference sample filtering; the reference sample filtering with the bilateral filter is applied on reference samples of the current block to obtain filtered reference samples when the reference sample filtering with the bilateral filter is enabled; and one or more samples of the current block are reconstructed according to the intra prediction using the filtered reference samples.

(28) An apparatus for video decoding, including processing circuitry that is configured to perform the method of any of features (1) to (13).

(29) An apparatus for video encoding, including processing circuitry that is configured to perform the method of any of features (14) to (26).

(30) A non-transitory computer-readable storage medium storing instructions which when executed by at least one processor cause the at least one processor to perform the method of any of features (1) to (27).

What is claimed is:

1. A method of video decoding, comprising:

receiving a bitstream that comprises coded information of one or more pictures, the coded information indicating an intra prediction of a current block;

determining whether a reference sample filtering is enabled for the current block based on one or more conditions associated with the reference sample filtering;

applying the reference sample filtering with a bilateral filter on reference samples of the current block to obtain filtered reference samples when (i) the one or more conditions indicate that the reference sample filtering is enabled and (ii) a block content variance of the current block is equal to or greater than a first threshold value; and reconstructing one or more samples of the current block according to the intra prediction using the filtered reference samples when (i) the one or more conditions indicate that the reference sample filtering is enabled and (ii) the block content variance of the current block is equal to or greater than the first threshold value.

2. The method of claim 1, wherein when the current block fails to satisfy the one or more conditions, the method further comprises:

reconstructing the one or more samples of the current block according to the intra prediction using the reference samples without filtering.

3. The method of claim 1, wherein the one or more conditions comprise at least one of:

a prediction mode of the intra prediction is not a vertical mode;

the prediction mode of the intra prediction is not a horizontal mode;

the prediction mode uses integer position reference samples;

no multiple reference line intra prediction is applied;

no sub-partition prediction is applied;

a block size of the current block is larger than a threshold;

the current block is a prediction block within luma component; and/or a flag associated with the current block is decoded from the bitstream and indicates a use of the bilateral filter.

4. The method of claim 1, wherein the reference sample filtering includes a single filtering stage of the bilateral filter.

5. The method of claim 1, wherein the reference sample filtering uses the bilateral filter and a predefined filter that are connected in series.

6. The method of claim 1, wherein the reference sample filtering uses the bilateral filter and a predefined filter that are connected in parallel.

7. The method of claim 6, wherein the applying comprises:

applying the predefined filter when a block size of the current block is less than a second threshold value; and applying the bilateral filter in the reference sample filtering when the block size of the current block is equal to or greater than the second threshold value.

8. The method of claim 6, wherein the applying comprises:

applying the predefined filter when the block content variance of the current block is less than the first threshold value; and applying the bilateral filter when the block content variance of the current block is equal to or greater than the first threshold value.

9. The method of claim 1, wherein the reference sample filtering includes the bilateral filter and/or a predefined filter, and the method comprises:

applying the bilateral filter on the reference samples to obtain the filtered reference samples when the current block fails to satisfy the one or more conditions; and applying the predefined filter on the reference samples to obtain the filtered reference samples when the current block satisfies the one or more conditions.

10. The method of claim 1, wherein the reference sample filtering includes the bilateral filter and/or a predefined filter, and the method comprises:

applying the bilateral filter on the reference samples to obtain first filtered reference samples;

reconstructing the one or more samples of the current block according to the intra prediction using the first filtered reference samples when the current block fails to satisfy the one or more conditions; and reconstructing the one or more samples of the current block according to the intra prediction using second filtered reference samples when the current block satisfies the one or more conditions, the second filtered reference samples being obtained by applying the predefined filter on the first filtered reference samples.

11. The method of claim 1, wherein the reference sample filtering includes the bilateral filter and/or a predefined filter, and the method comprises:

applying the predefined filter on the reference samples to obtain intermediate filtered reference samples when the current block satisfies the one or more conditions;

copying the reference samples to be the intermediate filtered reference samples when the current block fails to satisfy the one or more conditions;

applying the bilateral filter on the intermediate filtered reference samples to obtain the filtered reference samples; and reconstructing the current block according to the intra prediction using the filtered reference samples.

12. The method of claim 1, further comprising:

checking whether at least one of a decoder side intra mode derivation, a template-based intra mode derivation, and a gradient position dependent intra prediction is enabled; and when at least one of the decoder side intra mode derivation, the template-based intra mode derivation, and the gradient position dependent intra prediction is enabled, determining whether the current block satisfies the one or more conditions associated with the reference sample filtering including the bilateral filter.

13. The method of claim 1, further comprising:

decoding a flag from the bitstream, the flag being one of a sequence parameter set (SPS) level, a video parameter set (VPS) level, a picture parameter set (PPS) level, an adaptation parameter set (APS) level, a picture header level, a slice header level and/or a block level; and applying the reference sample filtering with the bilateral filter on the reference samples to obtain the filtered reference samples when the flag indicates a usage of the reference sample filtering with the bilateral filter.

14. A method of video encoding, comprising:

determining to encode a current block using an intra prediction;

determining whether a reference sample filtering is enabled for the current block based on one or more conditions associated with the reference sample filtering;

applying the reference sample filtering with a bilateral filter on reference samples of the current block to obtain filtered reference samples when (i) the one or more conditions indicate that the reference sample filtering is enabled and (ii) a block content variance of the current block is equal to or greater than a first threshold value; and encoding, using the intra prediction, the current block into coded information in a bitstream according to the filtered reference samples when (i) the one or more conditions indicate that the reference sample filtering is enabled and (ii) the block content variance of the current block is equal to or greater than the first threshold value.

15. The method of claim 14, wherein when the current block fails to satisfy the one or more conditions, the method further comprises:

encoding, using the intra prediction, the current block according to the reference samples without filtering.

16. The method of claim 14, wherein the one or more conditions comprise at least one of:

a prediction mode of the intra prediction is not a vertical mode;

the prediction mode of the intra prediction is not a horizontal mode;

the prediction mode uses integer position reference samples;

no multiple reference line intra prediction is applied;

no sub-partition prediction is applied;

a block size of the current block is larger than a threshold; and/or the current block is a prediction block within luma component.

17. The method of claim 14, wherein the reference sample filtering includes a single filtering stage of the bilateral filter.

18. The method of claim 14, wherein the reference sample filtering uses the bilateral filter and a predefined filter that are connected in series.

19. The method of claim 14, wherein the reference sample filtering uses the bilateral filter and a predefined filter that are connected in parallel.

20. A non-transitory computer-readable storage medium storing instructions which, when executed by a processor, cause the processor to perform a method of encoding a bitstream comprising:

determining to encode a current block using an intra prediction;

determining whether a reference sample filtering is enabled for the current block based on one or more conditions associated with the reference sample filtering;

applying the reference sample filtering with a bilateral filter on reference samples of the current block to obtain filtered reference samples when (i) the one or more conditions indicate that the reference sample filtering is enabled and (ii) a block content variance of the current block is equal to or greater than a first threshold value;

encoding, using the intra prediction, the current block in the bitstream according to the filtered reference samples when (i) the one or more conditions indicate that the reference sample filtering is enabled and (ii) the block content variance of the current block is equal to or greater than the first threshold value; and transmitting the encoded bitstream.

* * * * *